US008502430B2

(12) United States Patent
Yamada et al.

(10) Patent No.: US 8,502,430 B2
(45) Date of Patent: Aug. 6, 2013

(54) ROTOR AND MOTOR

(75) Inventors: Yoji Yamada, Hamamatsu (JP);
Shigemasa Kato, Toyohashi (JP)

(73) Assignee: ASMO Co., Ltd., Shizuoka-ken (JP)

( * ) Notice: Subject to any disclaimer, the term of this patent is extended or adjusted under 35 U.S.C. 154(b) by 0 days.

(21) Appl. No.: 13/237,390

(22) Filed: Sep. 20, 2011

(65) Prior Publication Data
US 2012/0112592 A1 May 10, 2012

(30) Foreign Application Priority Data

Nov. 11, 2010 (JP) .................. 2010-253060

(51) Int. Cl.
*H02K 1/27* (2006.01)
(52) U.S. Cl.
USPC ............. 310/156.53; 310/156.56; 310/156.55
(58) Field of Classification Search
USPC ............. 310/156.53, 156.01, 156.12, 156.48, 310/156.38, 156.56, 156.52
See application file for complete search history.

(56) References Cited

U.S. PATENT DOCUMENTS

| 6,472,789 B1 * | 10/2002 | Akemakou | 310/156.57 |
| 7,163,072 B2 * | 1/2007 | Yamaguchi | 180/65.24 |
| 7,414,343 B2 * | 8/2008 | Arita et al. | 310/181 |

FOREIGN PATENT DOCUMENTS

JP 9-327139 12/1997

* cited by examiner

*Primary Examiner* — Tran Nguyen
*Assistant Examiner* — Leda Pham
(74) *Attorney, Agent, or Firm* — Douglas J. Christensen

(57) ABSTRACT

A rotor comprises a rotor core, a plurality of magnetic poles arranged in a circumferential direction of the rotor core, a plurality of salient poles and a plurality of auxiliary magnets each of which is disposed between the magnetic pole and the salient pole is provided. Each magnet pole has a field magnet pole that serves as a first magnetic pole, wherein the field magnet is a main magnet. Each salient pole is integrally formed with the rotor core between the two adjacent magnetic poles. Each salient pole serves as a second magnetic pole. The pole of the second magnetic pole is opposite from that of the first magnetic pole. The auxiliary magnet generates magnetic flux in a circumferential direction of the rotor core so that the magnetic pole and an opposing pole of the auxiliary magnet have the same polarity and the salient pole and another opposing pole of the auxiliary magnet have the same polarity.

7 Claims, 4 Drawing Sheets

ROTOR AND MOTOR

The present invention relates to a consequent-pole type rotor and a motor.

BACKGROUND OF THE INVENTION

As a rotor used for a motor, a so-called consequent-pole type rotor is known. For example, as described in Japanese Laid-open Patent Publication No. 9-327139, such a rotor includes a plurality of magnetic poles and a plurality of salient poles. The magnetic poles are disposed in a circumferential direction of the rotor core and each of the magnetic poles includes a field magnet that serves as a first magnetic pole. Each of the salient pole is integrally formed with the rotor core between the two adjacent magnetic poles and serves as a second magnetic pole the pole of which is opposite from that of the first magnetic pole.

SUMMARY OF THE INVENTION

In the consequent-pole rotor as described in JP9-327139A, magnet poles are formed from magnetic poles that have a greater coersive force (induction) and salient poles made of soft magnetic material that have a smaller coersive force. Thus, the distribution of magnetic density in the rotor is non-uniform. Therefore, it is possible that a short will occur when magnetic flux, which should flow from the magnetic pole to the opposing stator, flows from the magnetic pole to the adjacent salient pole. As a result, a part of the magnetic flux generated from the field magnet becomes leakage flux that does not contribute to motor torque. This causes a decrease in output power of a motor.

An object of the present invention is to provide a rotor having an increased amount of magnetic flux that contributes to motor torque and thus contributes to higher power of a motor, and a motor having such a rotor.

In one aspect of the invention, a rotor comprising a rotor core, a plurality of magnetic poles arranged in a circumferential direction of the rotor core, a plurality of salient poles and a plurality of auxiliary magnets each of which is disposed between the magnetic pole and the salient pole is provided. Each magnet pole has a field magnet pole that serves as a first magnetic pole, wherein the field magnet is a main magnet. Each salient pole is integrally formed with the rotor core between the two adjacent magnetic poles. Each salient pole serves as a second magnetic pole. The pole of the second magnetic pole is opposite from that of the first magnetic pole. The auxiliary magnet generates magnetic flux in a circumferential direction of the rotor core so that the magnetic pole and an opposing pole of the auxiliary magnet have the same polarity and the salient pole and another opposing pole of the auxiliary magnet have the same polarity.

A motor comprising such a rotor is also provided.

DETAILED DESCRIPTION OF THE PREFERRED EMBODIMENTS

An embodiment of the present invention will be described with reference to the drawings.

Figure 1A:
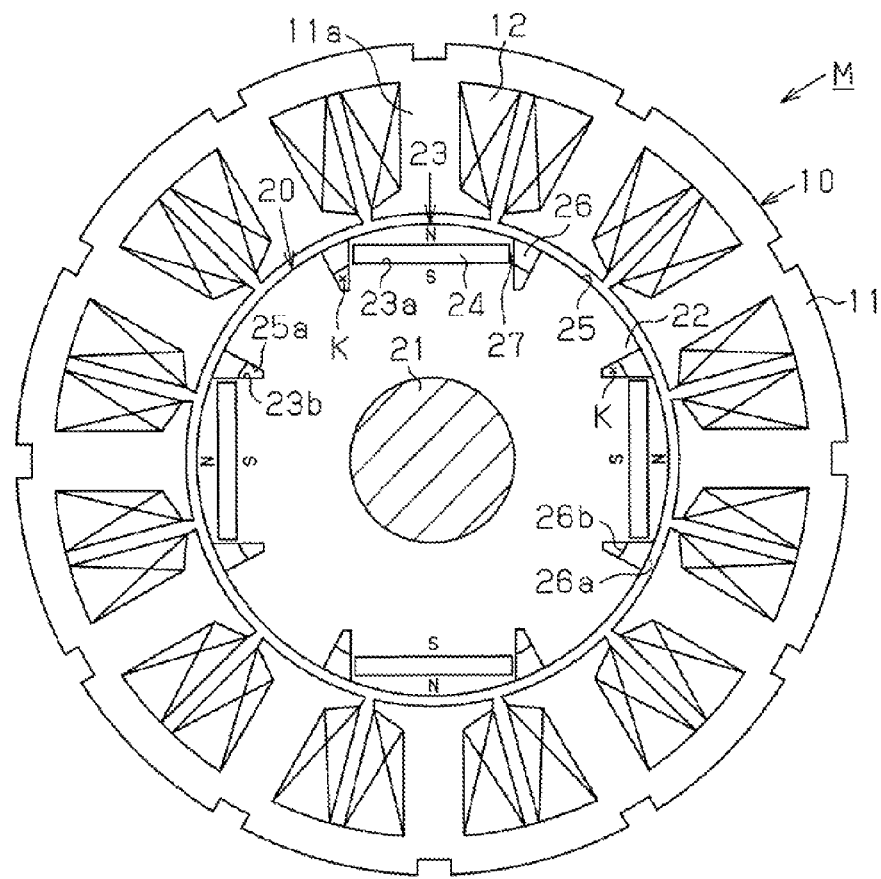
FIG. 1A is a diagram of consequent-pole type brushless motor according to one embodiment.
Figure 1B:
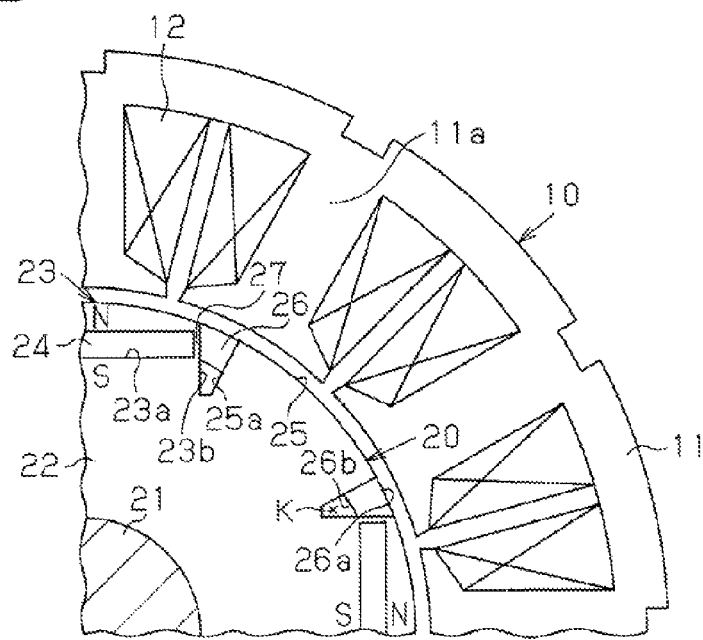
FIG. 1B is an enlarged view of the rotor.

As illustrated in FIGS. 1A and 1B, a brushless motor (also referred to as simply "a motor" hereinafter) M is an inner-rotor type motor in which a rotor 20 is rotatably housed inside a generally circular annular stator 10. The stator 10 includes a stator core 11 formed from a stack of a plurality of magnetic metal plates and twelve windings 12 wound concentrically around twelve teeth 11a provided on the stator core 11 at equal distances.

The rotor 20 disposed inside the stator 10 includes a circular annular stator core 22 formed from a stack of a plurality of magnetic metal plates. The rotor core 22 is fit over the outer peripheral surface of the rotational shaft 21. At the circumference of the rotor core 22, four convex magnet poles 23 are formed to protrude in the radial direction of the rotor core 22 at a distance of 90°. Each magnetic pole 23 includes a fitting hole 23a in a generally rectangular parallel-piped shape. The longitudinal direction of the fitting hole 23a (right-and-left direction in FIG. 1) is perpendicular to the radial direction of the rotor 20. A main magnet 24, which is an N-pole, conforms to the shape of each fitting hole 23a and fitted in the fitting hole 23a as a field magnet. A salient pole 25 is integrally formed with the outer circumferential portion of the rotor core 22 at the position between the adjacent magnetic poles 23. Each void K is provided between the magnetic pole 23 and the salient pole 25. The void K has a fixed area when viewed in a direction of the axis of the rotor 20. In other words, the magnetic poles 23 and the salient poles 25 are alternately disposed at a distance 45°. The rotor 20 is a so-called consequent-pole type rotor having 8 poles where the magnetic poles 23 serve as N poles while the salient poles 25 serve S poles. In this case, there are four (4) combinations of the N poles and S poles. Thus, the number of pole pairs is 4.

Each void K is defined by a side surface 23b of the magnetic pole 23 and a side surface 25a of the salient pole 25. The void K has a sectoral (fan-like) cross-sectional area having greater width in a circumferential direction from radially inward to radially outward of the rotor core 22. The side surface 23b is parallel with the straight line that passes through the center of the magnetic pole 23 and extends in a radial direction of the rotor core 22. The side surface 25a extends in a generally radial direction of the rotor core 22. The side surface 23b and the side surface 25a are connected at the radially inward of the void K via a surface that is generally perpendicular to the side surface 23b. An auxiliary magnet 26 is provided in the void K and bridges between the side surface 23b and the side surface 25a to plug the radially outer portion of the void K.

A radially outer side surface 26a of the auxiliary magnet 26 is formed along the outer periphery of the rotor core 22. A radially inner side surface 26a of the auxiliary magnet 26 is curved in a predetermined curvature. The auxiliary magnet 26 is fitted into the void K so that the outer side surface 26a is along the outer periphery of the rotor 20. In this fixed state, a radial length of the auxiliary magnet 26 is set so that the position of the inner side surface 26b of the auxiliary magnet 26 substantially aligned with the position of the radially inner end of the main magnet 24. By setting the length like this, a part of the void K remains radially inward of the inner side surface 26b of the auxiliary magnet 26.

The magnetization direction of the auxiliary magnet 26 (magnetic pole direction) is set so that magnetic flux is generated in a circumferential direction of the rotor core 22. For the magnetic poles of the auxiliary magnet 26, a portion of the auxiliary magnet 26 on the side of the magnetic pole 23 is an N pole and a portion of the auxiliary magnet 26 on the side of the salient pole 25 is an S pole. Each magnetic pole opposes a magnetic pole having the same polarity. The auxiliary magnet 26 and the main magnet 24 are connected via the end connecting portion 27 integrally formed with the rotor core 22 at either end of the fitting hole 23a in a longitudinal direction (right and left direction in FIG. 1A) of the fitting hole 23a.

The remanent magnetic flux density (Br) of the auxiliary magnet 26 is lower than that of the main magnet 24. Thus, costs for magnets necessary for manufacturing the rotor 20 can be reduced. In this regard, it is preferred that a rare-earth magnet be used as a main magnet 24 and a ferrite magnet be used as an auxiliary magnet 26.

Figure 2A:
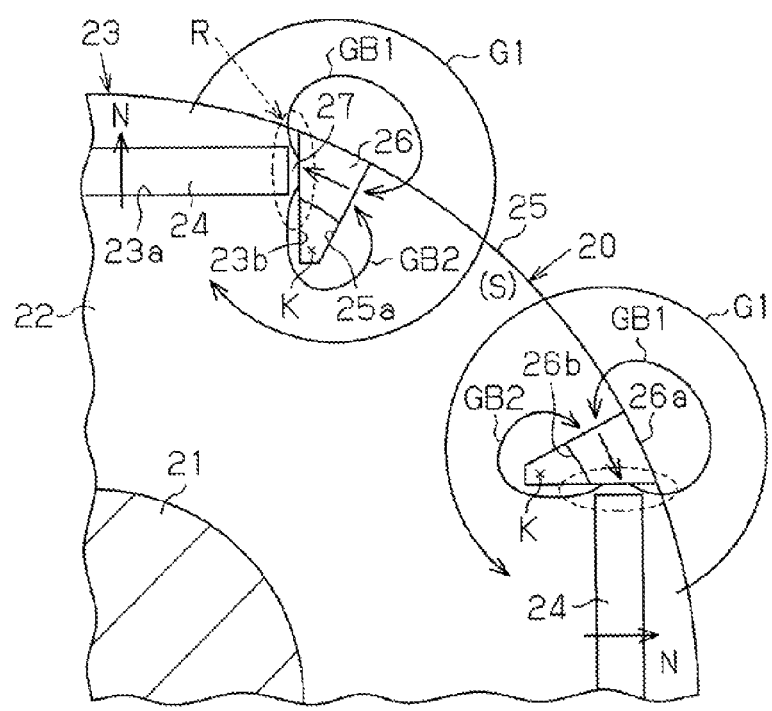
FIG. 2A is an enlarged view illustrating magnetic fluxes of the rotor.
Figure 2B:
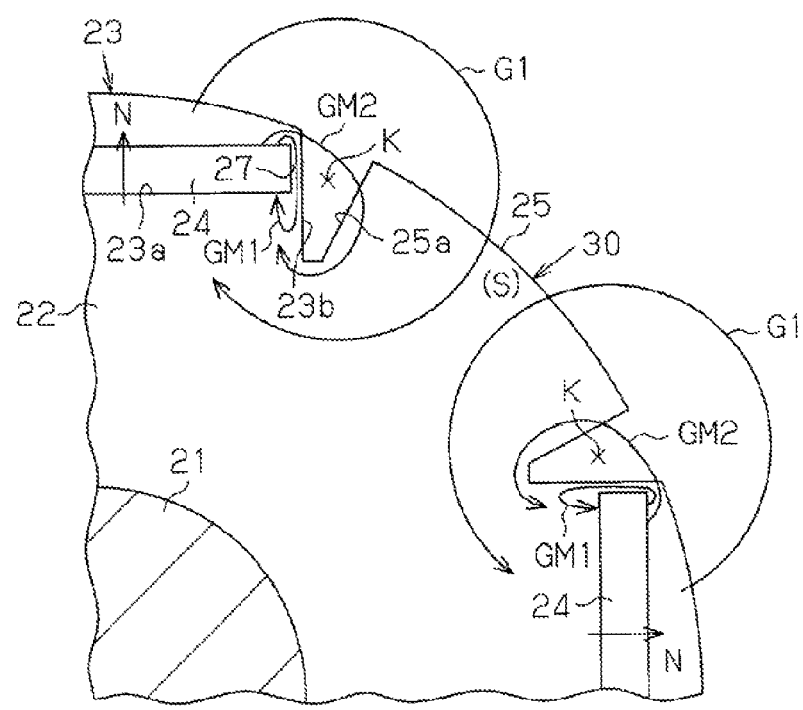
FIG. 2B is an enlarged view illustrating magnetic fluxes of a rotor in a comparative embodiment.

Next, by referring to FIG. 2A and FIG. 2B, the state of flux of the rotor 20 in the present embodiment and that of the rotor 30 in the comparative embodiment are described. The arrows in the FIGS. 2A and 2B at and around the main magnet 24 and the auxiliary magnet 26 indicate magnetization directions.

FIG. 2B is a rotor 30 as a comparative embodiment where the auxiliary magnets 26 are not placed in respective voids K. In the configuration of the rotor 30, compared to the normal rotor where all the magnetic poles are formed from the main magnets 24, coersive forces at the salient poles 25 are weak. Then, the distribution of magnetic density in the rotor 30 becomes non-uniform and it is likely that magnetic flux from the main magnet 24 generates or causes a short between the magnetic poles. For example, a part of the magnetic flux G1 that occurs from the main magnet 24 becomes leakage flux GM1, which shorts the end connecting portion 27 of the magnetic pole 23, and leakage flux GM2, which flows from the side surface 23b to the side surface 25a around the void K and shorts the salient pole 25. That is, a part of the magnetic flux G1 that is generated from the magnetic pole 23 toward the opposing teeth 11a becomes the leakage fluxes GM1, GM2 which do not contribute to motor torque, resulting in a decrease in output power of the motor.

Meanwhile, in the rotor 20 of the present embodiment as illustrated in FIG. 2A, a part of the magnetic flux generated at the auxiliary magnet 26 flows, for example, as a magnetic flux GB1, which flows from the side surface 23b (N-pole) of the auxiliary magnet 26 via a path radially outward of the rotor 20 to the side surface 25a (S-pole) of the auxiliary magnet 26 and as a magnetic flux GB2, which flows from the side surface 23b via a path radially inward of the rotor 20 (in the rotor core 22) to the S-pole. The magnetic fluxes generated at the auxiliary magnet 26 including the magnetic flux GB1 and GB2 substantially magnetically saturate a predetermined region R around the end connecting portion 27 (a portion encircled by the dashed line in FIG. 2A). Thus, generation of the leakage fluxes GM1 as illustrated in FIG. 2B is reduced. In addition, by providing each auxiliary magnet 26 in the void K as a magnetic resistance in which each magnetic pole opposes a magnetic pole having the same polarity, generation of the leakage fluxes GM2 is also reduced. Accordingly, by providing each auxiliary magnet 26 between the pair of magnetic poles, the leakage fluxes GM1 and GM2 are reduced, and the magnetic flux G1 that flows from the main magnet 24 toward the opposing teeth 11a may be increased. That is, the magnetic flux G1 of the main magnet 24 may contribute to generation of a motor torque effectively.

In the configuration of the rotor 30 in the comparative embodiment as illustrated in FIG. 2B, the leakage flux GM2 can be reduced by providing a sufficient width of the void K in a circumferential direction of the rotor 30 to magnetically separate the magnetic pole 23 and the salient pole 25. For example, by making the width of the void K approximately three times greater than the width of the void (not shown) between the rotor 20 and the stator 10, the leakage flux GM2 can be reduce preferably. However, increase in the width (magnitude) of the void K makes the size of the rotor 20 larger. On the other hand, in the rotor 20 of the present embodiment, generation of the leakage flux GM2 can be reduce and the width of the void K (i.e., the distance between the poles) can be kept small by using the auxiliary magnet 26 to magnetically space between the magnet poles. Thus, miniaturization of the rotor 20 is possible.

Moreover, the auxiliary magnet 26 is placed between the magnetic pole 23 that has a greater coersive force and the salient pole 25 that has a smaller coersive force. Thus, compared to the normal rotor in which all the magnetic poles are formed of the main magnets 24 and auxiliary magnet 26 is provided between the adjacent main magnets 24 each having a greater coersive force, in the rotor 20 of the present embodiment, a magnetic flux generated at the auxiliary magnet 26 easily flows toward the stator 10. For example, the magnetic flux GB1 flows from the end of the salient pole 25 toward the stator 1 to link with the opposing teeth 11a. In other words, in the consequent-pole type rotor 20 as in the present embodiment, an auxiliary magnet 26 is provided between each pair of magnetic poles to generate a magnetic flux against the opposing stator 10 so that an effective amount of magnetic flux for a motor torque is increased. By making the rotor 20 in an appropriate configuration including the auxiliary magnet 26, miniaturization and high output of the motor M are expected.

In the following, details of the additional magnet 26 provided in the rotor 20 of the present embodiment will be discussed.

Figure 3:
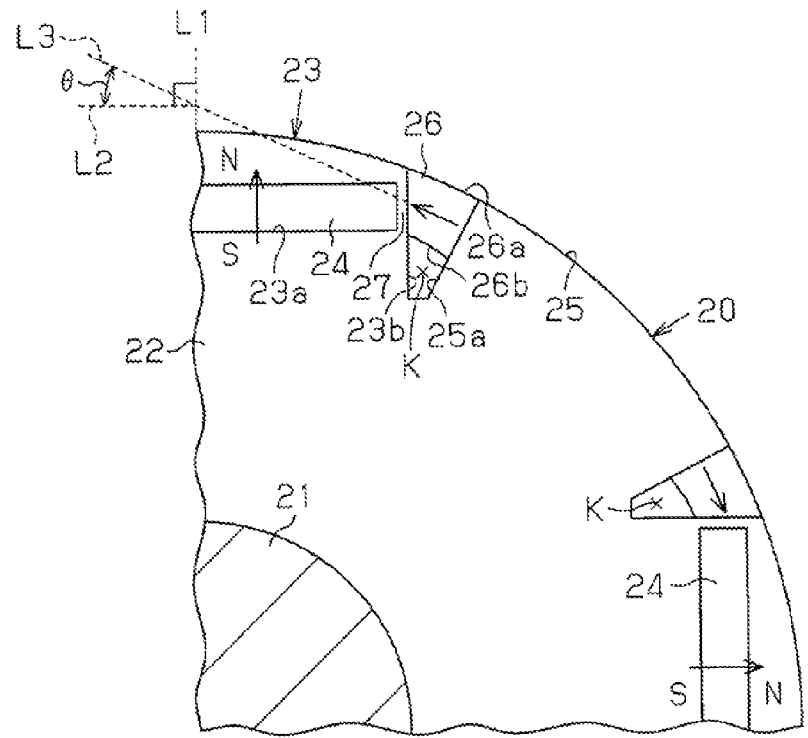
FIG. 3 is an enlarged view illustrating a central axis of a main magnet and a magnetization orientation angle.

As illustrated in FIG. 3, the central axis L1 is a linear line that passes through the center of the main magnet 24 in a circumferential direction of the rotor 20 and that extends in a radial direction of the rotor 20. The axis L2 is a linear line that is perpendicular to the central axis L1. The axis L3 indicates the magnetization direction of the auxiliary magnet 26. In this embodiment, the magnetization direction of the auxiliary magnet 26 on the central axis L1, i.e., the angle θ between the axis L3 and the axis L2 (referred to as "magnetization orientation angle" hereinafter) is set to a preferred value, as described below. The magnetization direction of the auxiliary magnet 26 is arranged at a predetermined angle with respect to the axis L2 that is perpendicular to the central axis L1.

Figure 4:
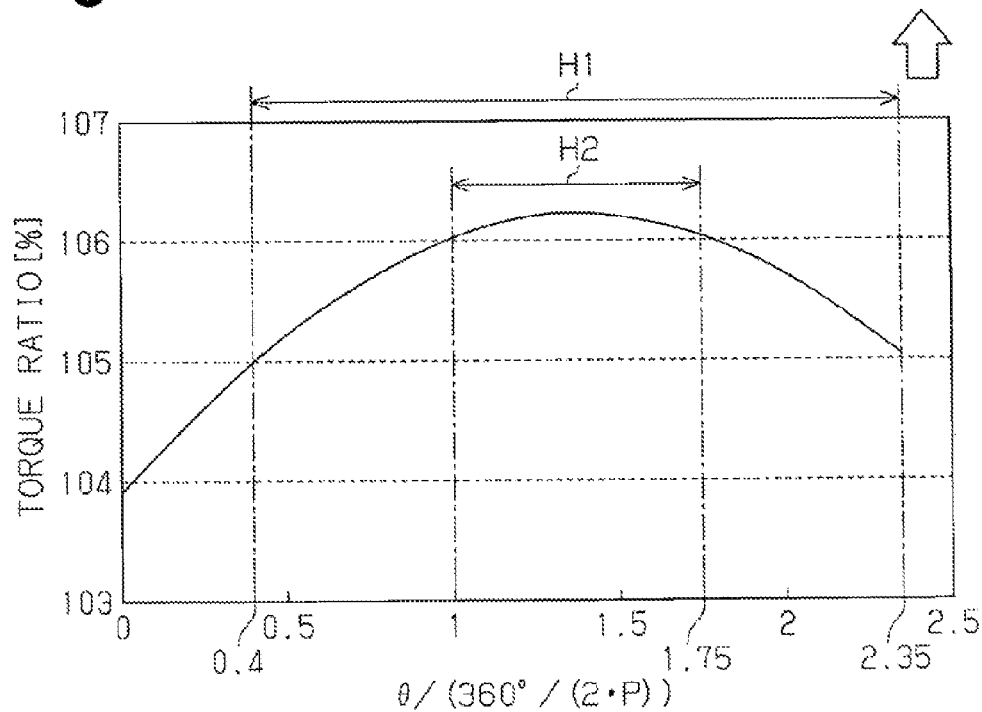
FIG. 4 is a graph representing the relationship between the magnetization orientation angle and a torque ratio.

Next, FIG. 4 illustrates a graph representing the torque ratio of the rotor 20 when the magnetization orientation angle θ is varied. The axis of the ordinate in FIG. 4 is the torque ratio (%). The torque of the motor M in the rotor 20 when the auxiliary magnet 26 is not provided is denoted as 100%. As indicated by the arrow on the right upper side of the graph, the higher the torque ratio is, the better the torque performance becomes. The axis of the abscissas is the value represented by θ/(360°/(2·P)), wherein θ is the degree of magnetization orientation and P is the number of the pole pairs of the rotor 20 (four (4) in this embodiment). For example, when the magnetization angle θ is 45°, the value of θ/(360°/(2·P)) results in one (1).

As illustrated in FIG. 4, when the applicant conducted simulations in the scope H1 where $0.4 \leq \theta/(360°/(2 \cdot P)) \leq 2.35$ (when P=4, the magnetization orientation angle θ is $18° \leq \theta \leq 105.75°$), the torque ratio is 105% or greater. It was found that this scope is a preferred scope for obtaining sufficient torque. Further, in the scope H2 where $1 \leq \theta/(360°/(2 \cdot P)) \leq 1.75$ (when P=4, the magnetization orientation angle θ is $45° \leq \theta \leq 78.75°$), the torque ratio is 106% or greater. It was found that the torque ratio reached approximately a maximum value. Thus, the rotor 20 of this embodiment can improve the torque of the motor M by setting the magnetization orientation angle θ based on these conditions.

Operations and effects of the present embodiment will be described.

(1) In the rotor 20 of the present embodiment, each auxiliary magnet 26 is placed in the void K between the magnetic pole 23 in which the main magnet 24 is placed and the salient pole 25 that serves as a counter magnetic pole. Each auxiliary magnet 26 generates magnetic flux in a circumferential direction of the rotor core 22 so that each magnetic pole opposes the magnetic pole having the same polarity. The magnetic fluxes generated from the auxiliary magnet 26 (the magnetic fluxes GB1 and GB2) substantially magnetically saturate the predetermined region R around the end connecting portion 27 of the main magnet 24. Thus, the leakage flux GM1 that shorts the end connecting portion 27 is reduced. In addition, since the auxiliary magnet 26 is placed in the void K as a magnetic resistance in which each magnetic pole opposes a magnetic pole having the same polarity, generation of the leakage flux GM2 that shorts the void K is also reduced. Accordingly, by providing each auxiliary magnet 26, the leakage fluxes GM1 and GM2 are reduced, and the magnetic flux G1 that flows from the main magnet 24 contributes to generation of motor torque. Thus, high output of the motor M is possible.

(2) In the rotor 20 of the present embodiment, each auxiliary magnet 26 is placed in the void K to magnetically space between the two poles. This makes the width of the void K small and miniaturization of the rotor 20 is achieved.

(3) In the present embodiment, the salient pole 25 that is a smaller coersive force is placed adjacent the auxiliary magnet 26. Thus, a part of the magnetic flux (the magnetic flux GB1) generated from the auxiliary magnet 26 is not induced toward the salient pole 25 but flows toward the teeth 11a of the stator 10. That is, a part of the magnetic flux of the auxiliary magnet 26 can contribute to generation of motor torque. Thus, high output of the motor M is possible.

(4) In the present embodiment, the magnetization direction of the auxiliary magnet 26 is specified by the magnetization orientation angle θ with respect to the axis L2 that is perpendicular to the central axis L1 of the magnet pole of the main magnet 24. By setting the magnetization orientation angle θ so that the value of $\theta/(360°/(2 \cdot P))$ is within the scope H1 ($0.4 \leq \theta/(360°/(2 \cdot P)) \leq 2.35$), wherein P is the number of pole pairs, improvement of torque of the motor M is ensured. Further, by setting the value of $\theta/(360°/(2 \cdot P))$ within the scope H2 ($1 \leq \theta/(360°/(2 \cdot P)) \leq 1.75$), torque of the motor M is improved to approximately the maximum value.

(5) The remanent magnetic flux density (Br) of the auxiliary magnet 26 of the present embodiment is lower than that of main magnet 24. The auxiliary magnet 26 is inexpensive, and costs for magnets necessary for manufacturing the rotor 20 can be reduced. In this case, a rare-earth magnet is used as the main magnet 24 and a ferrite magnet is used as the auxiliary magnet 26. Thus, the rotor 20 can be configured appropriately while reducing costs.

The present embodiment may be modified as follows.

Figure 5:
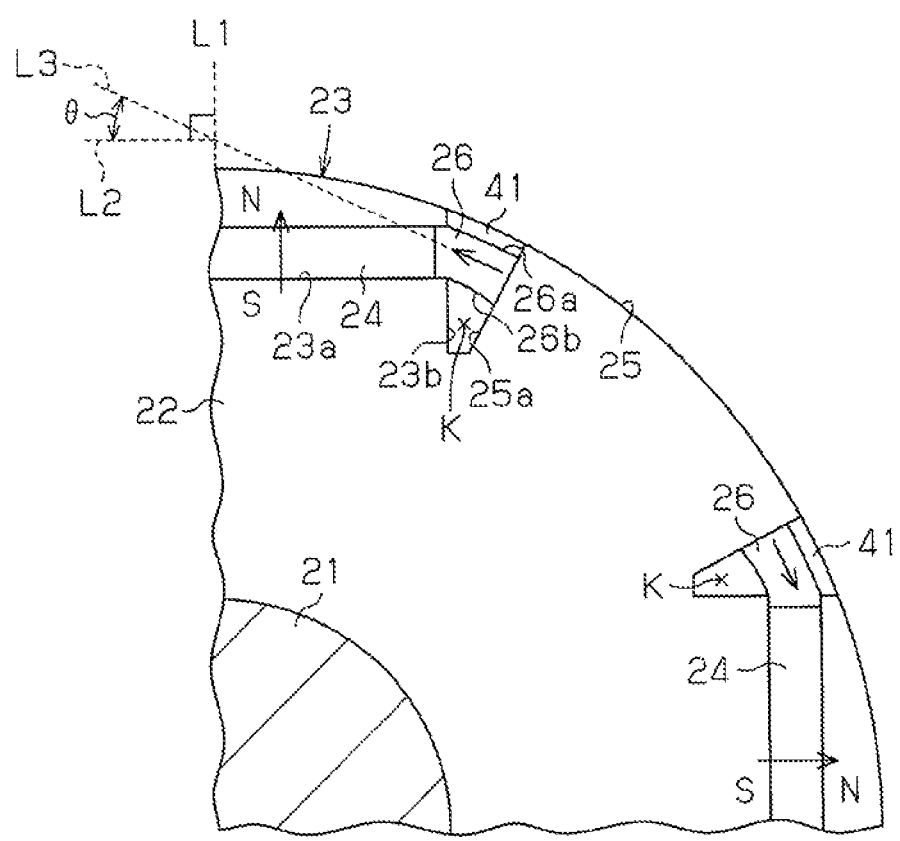
FIG. 5 is an enlarged view illustrating the structure of a rotor according to another embodiment.

In the above embodiment, the auxiliary magnet 26 and the corresponding main magnet 24 are connected via the end connecting portion 27 at the end of the fitting hole 23a in a longitudinal direction of the fitting hole 23a. However, for example, as illustrated in FIG. 5, the connecting portions 27 may be omitted and the auxiliary magnet 26 may be directly connected to the main magnet 24 in a circumferential direction of the rotor 20. Since the end connecting portion 27, which is a member for shorting magnetic flux at the end of the main magnet 24 (or a member for generating leakage flux GM1), is omitted, each auxiliary magnet 26 itself becomes a magnetic resistance to reduce leakage flux.

In the above embodiment, the auxiliary magnet 26 is fitted into the void K at the position where the outer side surface 26a of the magnet 26 extends along an outer periphery of the rotor 20. However, for example, as illustrated in FIG. 5, outer circumferential connecting portion 41 may be formed in the void K to connect the magnetic pole 23 and the salient pole 25 at the radially outward position of the rotor 20, and the auxiliary magnet 26 may be positioned radially inward of the outer circumferential connecting portion 41. This enables secure fixation of the auxiliary magnet 26 to the rotor core 22. In this regard, by making the magnetic resistance of the outer circumferential connecting portion 41 higher than that of the remaining portion of the rotor core 22 (e.g., by thin-wall processing or non-magnetization with laser irradiation), leakage flux is reduced favorably.

The shape of the auxiliary magnet 26 may be modified appropriately. For example, the auxiliary magnet 26 may be formed to fit into the entire void K.

The rotor core 22 and the stator core 11 are not limited to a stack of magnetic metal plates. For example, the rotor core 22 and the stator core 11 may be formed by molding magnetic powders.

In the above embodiment, the rotor 20 is so-called IPM (Interior Permanent Magnet) type where the main magnet 24 is embedded in the magnetic pole. However, the configuration is not limited thereto and the rotor may be modified as a consequent-pole rotor of a so-called SPM (Surface Permanent Magnet) type where the main magnet 24 is placed on the outer peripheral surface of the rotor core 22.

The number of magnetic poles of the rotor 20 and the number of magnetic poles of the stator 10 may be varied as appropriate.

What is claimed is:

1. A rotor comprising:
    a rotor core;
    a plurality of magnetic poles arranged in a circumferential direction of the rotor core, wherein each magnetic pole has a field magnet that serves as a first magnetic pole, wherein the field magnet is a main magnet;
    a plurality of salient poles, wherein each salient pole is integrally formed with the rotor core between the two adjacent magnetic poles, wherein each salient pole serves as a second magnetic pole, wherein the pole of the second magnetic pole is opposite from that of the first magnetic pole; and
    a plurality of auxiliary magnets each of which is disposed between the magnetic pole and the adjacent salient pole, wherein the auxiliary magnet generates magnetic flux in a circumferential direction of the rotor core so that the magnetic pole and an opposing pole of the auxiliary magnet have the same polarity and the salient pole and another opposing pole of the auxiliary magnet have the same polarity.

2. The rotor according to claim 1, wherein when a central axis L1 is a linear line that passes through the center of the main magnet in a circumferential direction of the rotor core and that extends in a radial direction of the rotor core, and an angle θ is an angle on the central axis between an axis is perpendicular to the central axis and the magnetization direction of the auxiliary magnet, the angle θ is set in a scope that satisfies $$0.4 \leq \theta(360°/(2 \cdot P)) \leq 2.35,$$

wherein P is the number of pole pairs of the rotor core.

3. The rotor according to claim 2, wherein the angle θ is set in a scope that satisfies $$1 \leq \theta/(360°/(2 \cdot P)) \leq 1.75.$$

4. The rotor according to claim 1, wherein the remanent magnetic flux density of the auxiliary magnet is lower than that of the main magnet.

5. The rotor according to claim 1, wherein the main magnet is made of a rare-earth magnet and the auxiliary magnet is made of a ferrite magnet.

6. The rotor according to claim 1, wherein the rotor further comprises
a connecting portion for connecting the magnetic pole and the salient pole at a position outward of the auxiliary magnet in the radial direction of the rotor,
wherein the main magnet is supported with the auxiliary magnet in a circumferential direction of the rotor,
the auxiliary magnet is supported with the connecting portion in the radial direction of the rotor, and
an electric resistance of the connecting portion is higher than the remaining portion of the rotor core.

7. A motor comprising a rotor, wherein the rotor includes:
a rotor core;
a plurality of magnetic poles arranged in a circumferential direction of the rotor core, wherein each magnetic pole has a field magnet that serves as a first magnetic pole, wherein the field magnet is a main magnet;
a plurality of salient poles, wherein each salient pole is integrally formed with the rotor core between the two adjacent magnetic poles, wherein each salient pole serves as a second magnetic pole, wherein the pole of the second magnetic pole is opposite from that of the first magnetic pole; and
a plurality of auxiliary magnets each of which is disposed between the magnetic pole and the adjacent salient pole, wherein the auxiliary magnet generates magnetic flux in a circumferential direction of the rotor core so that the magnetic pole and an opposing pole of the auxiliary magnet have the same polarity and the salient pole and another opposing pole of the auxiliary magnet have the same polarity.

* * * * *